(12) United States Patent
Kim et al.

(10) Patent No.: US 8,777,686 B2
(45) Date of Patent: Jul. 15, 2014

(54) METHOD OF JETTING A LIQUID CRYSTAL, LIQUID CRYSTAL JETTING APPARATUS FOR PERFORMING THE METHOD AND METHOD OF MANUFACTURING A LIQUID CRYSTAL PANEL USING THE APPARATUS

(71) Applicant: Samsung Display Co., Ltd., Yongin (KR)

(72) Inventors: Tae-Gyun Kim, Seoul (KR); Seung-Yeon Chae, Hwaseong-si (KR); Tae-Woon Cha, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/679,817

(22) Filed: Nov. 16, 2012

(65) Prior Publication Data

US 2013/0267143 A1 Oct. 10, 2013

(30) Foreign Application Priority Data

Apr. 4, 2012 (KR) .................. 10-2012-0034926

(51) Int. Cl.
*G02F 1/1341* (2006.01)
*G02F 1/13* (2006.01)

(52) U.S. Cl.
USPC .............................. 445/25; 427/162; 118/712

(58) Field of Classification Search
USPC .................... 445/50, 25; 427/162; 118/712
See application file for complete search history.

(56) References Cited

U.S. PATENT DOCUMENTS

2006/0262153 A1 11/2006 Kasuga
2011/0234703 A1 9/2011 Kodoi

FOREIGN PATENT DOCUMENTS

KR 10-2008-0090887 10/2008

*Primary Examiner* — Tracie Y Green
(74) *Attorney, Agent, or Firm* — Innovation Counsel LLP

(57) ABSTRACT

A method of jetting a liquid crystal includes loading a substrate on a stage, controlling a surface temperature of an inkjet head and a substrate to be a setting temperature, and jetting the liquid crystal molecules on the substrate having the setting temperature.

15 Claims, 5 Drawing Sheets

METHOD OF JETTING A LIQUID CRYSTAL, LIQUID CRYSTAL JETTING APPARATUS FOR PERFORMING THE METHOD AND METHOD OF MANUFACTURING A LIQUID CRYSTAL PANEL USING THE APPARATUS

This application claims priority from and the benefit of Korean Patent Application No. 10-2012-0034926, filed on Apr. 4, 2012, which is hereby incorporated by reference for all purposes as if fully set forth herein.

BACKGROUND OF THE INVENTION

1. Field of the Invention

Exemplary embodiments of the present invention relate to a method of jetting a liquid crystal, an liquid crystal jetting apparatus for performing the method and a method of manufacturing a liquid crystal panel using the above-mentioned apparatus. More particularly, exemplary embodiments of the present invention relate to a method of jetting a liquid crystal used in a liquid crystal display device, a liquid crystal jetting apparatus for performing the method and a method of manufacturing a liquid crystal panel using the above-mentioned apparatus.

2. Description of the Related Art

A conventional liquid crystal display ("LCD") device includes a lower substrate, an upper substrate, and a liquid crystal layer interposed between the lower substrate and the upper substrate. A pixel electrode is formed on the lower substrate, and a common electrode is formed on the upper substrate. When a voltage is applied between the pixel electrode and the common electrode, an arrangement of liquid crystal molecules of the liquid crystal layer is changed, and optical transmittance of the liquid crystal molecules is adjusted in accordance with the changed arrangement of the liquid crystal molecules to display an image.

Examples of a method for disposing the liquid crystal molecules between the lower substrate and the upper substrate include an injecting method and a dropping method.

There are some problems in the injecting method. For example, more liquid crystal molecules than an intended amount can be supplied to a cell gap between the lower substrate and the upper substrate, or an additional process for cleaning the LCD panel contaminated with the oversupplied liquid crystal molecules may be necessary. There are also some problems in the dropping method. For example, a size of a droplet of the liquid crystal molecule dropped on a substrate is too large, and a degree of spread of the dropped liquid crystal molecules may be different. Therefore, a boundary between adjacent droplets of the liquid crystal molecules may be perceived by sight, which causes a stain to appear in the liquid crystal layer. Accordingly, a baking process for removing the stain of the liquid crystal layer may be necessary in the dropping method, and thus the process for disposing the liquid crystal molecules becomes complicated.

A spray method has been proposed to solve the stain problem of the dropping method. However, it is hard to control a size, a volume, and a drop position of the droplet in the spray method. Therefore, it is difficult to form a liquid crystal layer having an uniform thickness using the spray method.

BRIEF SUMMARY OF THE INVENTION

Exemplary embodiments of the present invention provide a method of jetting a liquid crystal for removing a stain of a liquid crystal layer.

Exemplary embodiments of the present invention also provide a liquid crystal jetting apparatus for performing the method.

Exemplary embodiments of the present invention also provide a method of manufacturing a liquid crystal panel using the apparatus.

According to an exemplary embodiment of the invention, there is provided a method of jetting a liquid crystal, the method includes loading a substrate on a stage, controlling a surface temperature of an inkjet head and the substrate to be a setting temperature, and jetting liquid crystal molecules on the substrate having the setting temperature.

In an exemplary embodiment, wherein the controlling a surface temperature of an inkjet head and the substrate may include measuring a surface temperature of the inkjet head, and controlling the surface temperature of the substrate based on a measured temperature of the inkjet head.

In an exemplary embodiment, wherein the controlling the surface temperature of the substrate may include controlling a temperature of the stage by controlling a temperature of a plurality of heat lines disposed in the stage.

In an exemplary embodiment, wherein the measuring a surface temperature of the inkjet head may include measuring a temperature of a surface of the inkjet head on which the nozzles are disposed.

In an exemplary embodiment, wherein a surface temperature difference between the inkjet head and the substrate may be less than or equal to about 1° C.

According to still another exemplary embodiment of the invention, there is provided an apparatus jetting a liquid crystal. The apparatus includes an inkjet head including a plurality of nozzles jetting the liquid crystal molecules, a first temperature measuring part formed on the inkjet head and configured to measure a surface temperature of the inkjet head, a stage including a substrate heating part formed under a surface of the stage, and a temperature control part electrically connected to a first temperature measuring part and controlling the substrate heating part to be a setting temperature.

In an exemplary embodiment, the apparatus may further include a liquid crystal container storing the liquid crystal molecules, and a liquid crystal heating part heating the liquid crystal molecules stored in the liquid crystal container.

In an exemplary embodiment, the apparatus may further include a second temperature measuring part formed on the stage and configured to measure a surface temperature of the substrate.

In an exemplary embodiment, wherein the stage may include a plurality of heat lines, and the temperature control part may control a temperature of the heat lines.

In an exemplary embodiment, wherein the first temperature measuring part may measure a temperature of a surface of the inkjet head on which the nozzles are disposed.

In an exemplary embodiment, wherein the temperature control part may control the substrate heating part so that a surface temperature difference between the inkjet head and the substrate is less than or equal to about 1° C.

According to still another exemplary embodiment of the invention, there is provided a method of manufacturing a liquid crystal panel, the method includes forming a first substrate including a first alignment layer, loading the first substrate on a stage, controlling a surface temperature of an inkjet head and the first substrate to be a setting temperature, jetting liquid crystal molecules on the first substrate, and combining the first substrate including a liquid crystal layer thereon and a second substrate including a second alignment layer.

In an exemplary embodiment, the method may further include forming a seal member in a peripheral area of the first substrate, and forming a shorting member in the peripheral area of the first substrate, wherein the first substrate which includes the seal member and the shorting member may be loaded on the stage.

In an exemplary embodiment, the jetting liquid crystal molecules may include measuring the surface temperature of the inkjet head including nozzles jetting the liquid crystal, controlling a surface temperature of the first substrate into the setting temperature based on a measured temperature of the inkjet head, and jetting the liquid crystal molecules on the first substrate having the setting temperature.

In an exemplary embodiment, wherein the controlling a surface temperature of the first substrate may include controlling a temperature of the stage having the first substrate.

In an exemplary embodiment, wherein the controlling a temperature of the stage may include comprises controlling a temperature of a plurality of heat lines disposed in the stage.

In an exemplary embodiment, wherein the measuring the surface temperature of the inkjet head may include measuring a temperature of a surface on which the nozzles are disposed.

In an exemplary embodiment, wherein a surface temperature difference between the inkjet head and the first substrate may be less than or equal to about 1° C.

In an exemplary embodiment, wherein the first substrate may include a plurality of thin film transistors and a plurality of pixel electrodes, and the second substrate includes a common electrode opposite to the pixel electrodes.

In an exemplary embodiment, wherein the first substrate may include a common electrode, and the second substrate may include a plurality of pixel electrodes opposite to the common electrode and a plurality of thin film transistors.

In an exemplary embodiment, wherein a surface temperature difference between the inkjet head and the substrate may be less than or equal to about 1° C.

In an exemplary embodiment, wherein the controlling a surface temperature of a substrate may include measuring a surface temperature of the inkjet head, measuring a surface temperature of the substrate, and controlling the surface temperature of the substrate and the inkjet head to have substantially the same temperature.

In an exemplary embodiment, wherein a surface temperature difference between the inkjet head and the substrate may be less than or equal to about 1° C.

According to the present invention, the surface temperature of the inkjet head is synchronized with the surface temperature of the substrate so that the layer formed on the substrate may be prevented from being damaged by a temperature difference between the inkjet head and the substrate.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Hereinafter, the present invention will be explained in detail with reference to the accompanying drawings.

Figure 1:
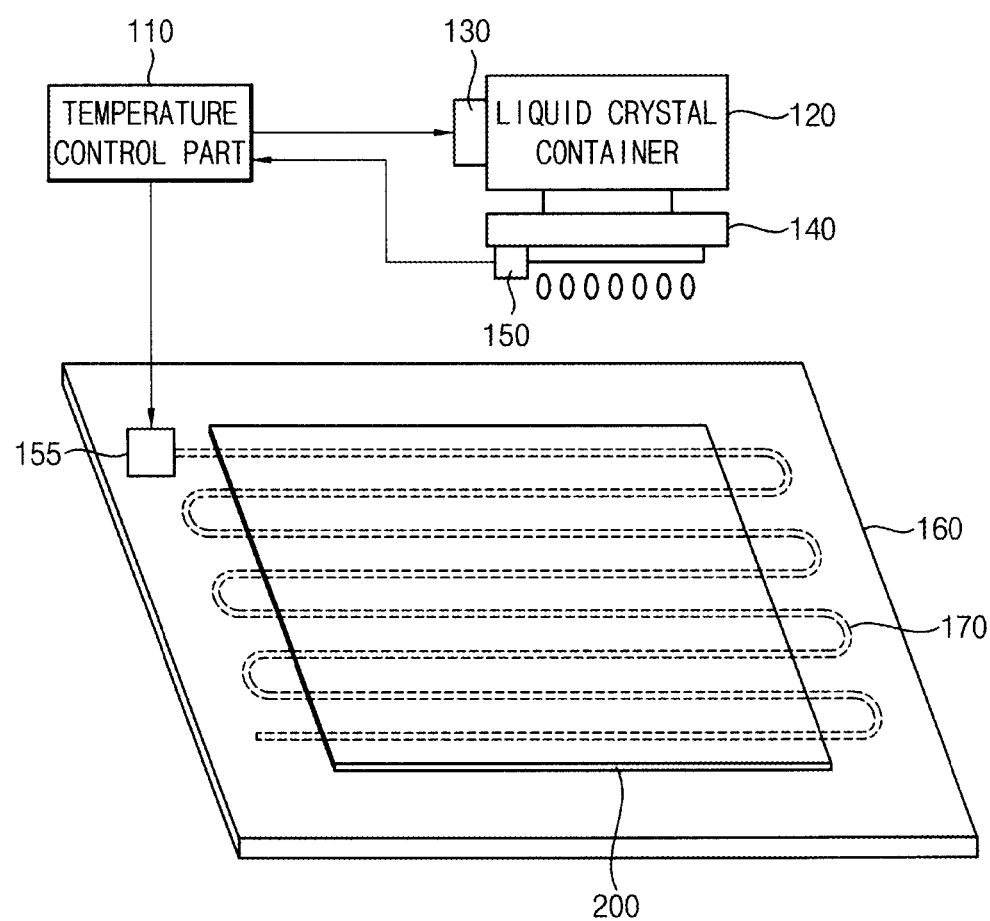
FIG. 1 is a schematic diagram illustrating an exemplary embodiment of a liquid crystal jetting apparatus according to the invention.

FIG. 1 is a schematic diagram illustrating an exemplary embodiment of a liquid crystal jetting apparatus according to the invention.

Referring to FIG. 1, the liquid crystal jetting apparatus jets liquid crystal molecules on a first substrate 200 using an inkjet printing method. The liquid crystal jetting apparatus in accordance with the exemplary embodiment includes a temperature control part 110, a liquid crystal container 120, a liquid crystal heating part 130, an inkjet head 140, a first temperature measuring part 150, a second temperature measuring part 155, a stage 160 and a substrate heating part 170.

The temperature control part 110 controls a temperature of an element included in the liquid crystal jetting apparatus. According to the exemplary embodiment, the temperature control part 110 controls a surface temperature of the first substrate 200 based on a surface temperature of the inkjet head 140 which includes a plurality of nozzles jetting liquid crystal molecules.

The liquid crystal container 120 stores the liquid crystal molecules.

The liquid crystal heating part 130 heats the liquid crystal container 120 so that the liquid crystal molecules stored in the liquid crystal container 120 may be heated to a first setting temperature. For example, the liquid crystal molecules have a viscosity of about 20 cp at room temperature. When the liquid crystal molecules have the viscosity of about 10 cp, the liquid crystal molecules may be jetted stably. Thus, the liquid crystal heating part 130 heats the liquid crystal container 120 so that the liquid crystal molecules stored in the liquid crystal container 120 have the viscosity of about 10 cp.

The inkjet head 140 includes a first surface where the liquid crystal container 120 is connected and a second surface where a plurality of nozzles jetting the liquid crystal molecules are disposed.

The first temperature measuring part 150 measures the surface temperature of the inkjet head 140. For example, the first temperature measuring part 150 may include a first sensor sensing the temperature. The first sensor may be disposed on the second surface, on which the nozzles are disposed, to sense the temperature of the second surface. The most preferable position of the first sensor is the closest position to the first substrate 200. The first temperature measuring part 150 provides the control part 110 with the measured temperature.

The second temperature measuring part 155 measures the surface temperature of the first substrate 200 or the surface temperature of the stage 160. The surface temperature of the first substrate means the surface temperature of the first substrate or the surface temperature of the stage, hereinafter. For example, the second temperature measuring part 155 may include a second sensor sensing the temperature of the surface of the first substrate 200. The second sensor may be disposed on the stage 160. The second temperature measuring part 155 provides the control part 110 with the measured temperature of the surface of the first substrate 200.

After loading the first substrate 200 on the stage 160, the liquid crystal molecules are jetted on the first substrate 200 in order to form a liquid crystal layer on the first substrate 200. The stage 160 loaded with the first substrate 200 may be moved.

The substrate heating part 170 heats the first substrate 200 loaded on the stage 160 so that the temperature of the first substrate 200 may be a second setting temperature. The second setting temperature may be substantially the same as the surface temperature of the inkjet head 140 measured by the first temperature measuring part 150. A temperature difference between the second setting temperature and the surface temperature of the inkjet head 140 may be less than or equal to about 1° C.

Therefore, the surface temperature of the first substrate 200, which is heated by the substrate heating part 170, may be substantially the same as the surface temperature of the inkjet head 140, so that an alignment layer formed on the first substrate 200 may be prevented from being damaged by a heat of the inkjet head 140. As a result, a liquid crystal dropping stain by the damage of the alignment layer may be prevented.

For example, the substrate heating part 170 may includes a plurality of heat lines disposed in the stage 160. In the exemplary embodiment, a heat member of the first substrate 200 is referred to as the heat lines. However, the heat members can be selected from a various known instruments.

Figure 2:
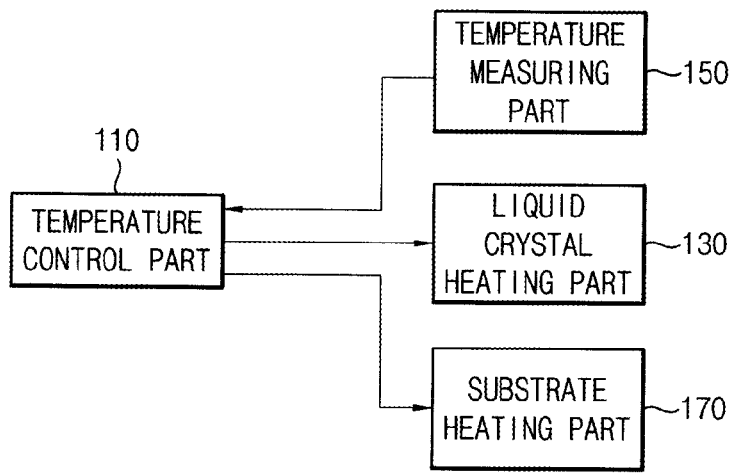
FIG. 2 is a block diagram illustrating the liquid crystal jetting apparatus in FIG. 1.
Figure 3:
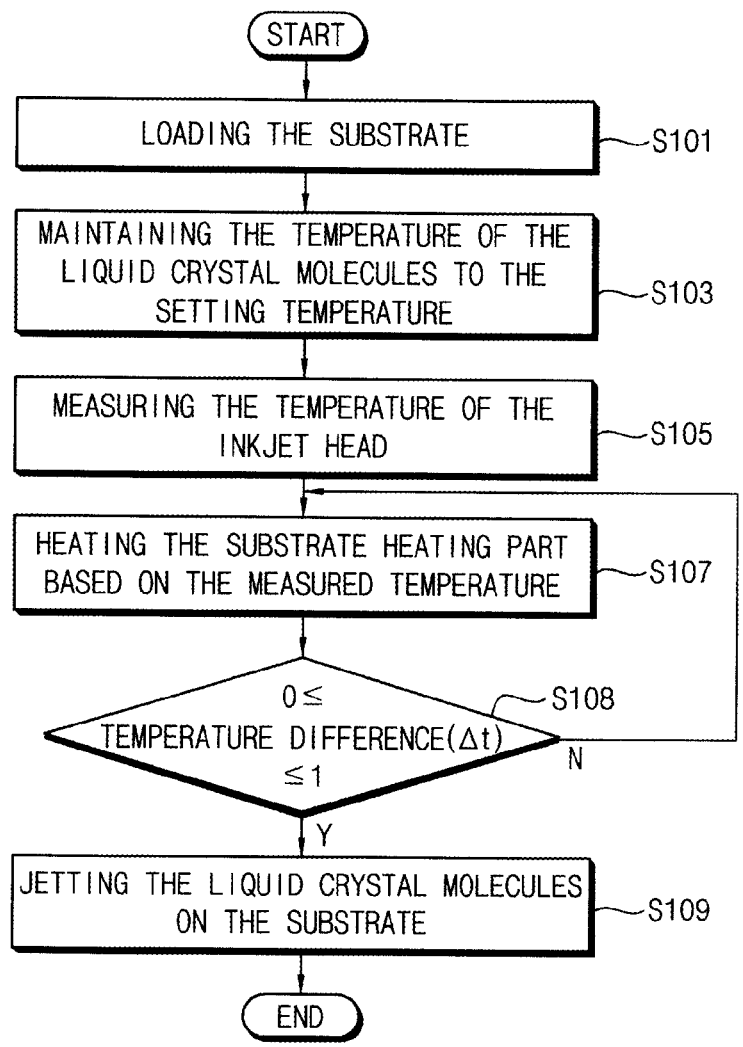
FIG. 3 is a flowchart view illustrating a method of jetting the liquid crystal molecules according to the liquid crystal jetting apparatus in FIG. 1.

FIG. 2 is a block diagram illustrating the liquid crystal jetting apparatus in FIG. 1. FIG. 3 is a flowchart view illustrating a method of jetting the liquid crystal molecules according to the liquid crystal jetting apparatus in FIG. 1.

Referring to FIGS. 1 and 3, the first substrate 200 is loaded on the stage 160 (step S101).

The temperature control part 110 controls the liquid crystal heating part 130 so that the liquid crystal molecules stored in the liquid crystal container 120 are heated to the first setting temperature. Thus, the temperature of the liquid crystal molecules is maintained to the first setting temperature (Step S103).

The temperature control part 110 controls the first temperature measuring part 150 and the second temperature measuring part so that the surface temperature of the inkjet head 140 and the surface temperature of the substrate 200 or the stage 160 may be measured (Step S105). The first temperature measuring part 150 measures a surface temperature of the inkjet head 140 at the nearest surface to the first substrate 200. For example, the first temperature measuring part 150 measures the temperature Ht of the surface on which a plurality of nozzles jetting the liquid crystal molecules is disposed. The second temperature measuring part 155 measures the surface temperature of the first substrate 200.

The temperature control part 110 controls the substrate heating part 170 based on the measured temperature Ht of the inkjet head 140 (Step S107). The temperature control part 110 may control the temperature of the first substrate 200 without feedback from a surface temperature of the inkjet head 140. The temperature control part 110 may control the surface temperature of the first substrate 200, and the surface temperature of the inkjet head 140 to be the second setting temperature, respectively.

The temperature control part 110 controls the substrate heating part 170 so that the temperature difference Δt between the surface temperature of the first substrate 200 or the stage 160, and the measured temperature Ht may be less than or equal to about 1° C. (Step S108). According to the exemplary embodiment, the temperature control part 110 controls the substrate heating part 170 such as the heat line disposed in the stage 160 so that the surface temperature of the first substrate 200 loaded on the stage 160 or the stage 160 may be controlled to be the second setting temperature.

After the surface temperature of the first substrate 200 or the stage 160 is controlled to be substantially the same as the surface temperature of the inkjet head 140, the liquid crystal molecules are jetted on the first substrate 200 through the nozzles of the inkjet head 140 (Step S109).

As described above, the surface temperature of the first substrate 200 or the stage 160 may be substantially the same as the surface temperature of the inkjet head 140 so that the alignment layer disposed on the first substrate 200 may be prevented from being damaged by the temperature difference between the alignment layer and the inkjet head 140. Therefore, the liquid crystal dropping stain which may be occurred in a liquid crystal dropping process may be removed.

There are many ways to control the temperature of the inkjet head 140 and the temperature of the first substrate 200. For example, the substrate heating part 170 may heat entire first substrate 200 without consideration of a movement of the inkjet head 140. Alternatively, the substrate heating part 170 may partially heat the first substrate 200 according to the movement of the inkjet head 140. In this case, the substrate heating part 170 may be designed and controlled in order that the first substrate 200 can be partially heated.

The measured liquid crystal dropping stain according to the temperature difference between the inkjet head and the first substrate is shown in Table 1.

TABLE 1

Temperature of the inkjet head: 50, Temperature of the first substrate: 27

| Distance between the first substrate and the inkjet head | The measured temperature of the first substrate | The result of the stain |
|---|---|---|
| 1.5 mm | 30 | Much stain |
| 2.5 mm | 29 | Few stain |
| 3.5 mm | 28 | No stain |
| 4.5 mm | 28 | No stain |

Referring to Table 1, the liquid crystal molecules were jetted on the first substrate 200 while maintaining the temperature of the inkjet head at about 50° C. and the temperature of the first substrate at about 27° C. The liquid crystal dropping stain was measured according to a temperature change of the first substrate corresponding to the distance between the first substrate and the inkjet head.

When the distance between the first substrate and the inkjet head was about 1.5 mm, the temperature of the first substrate went up to about 30° C. by the heat of the inkjet head having the temperature of about 50° C. The temperature difference between an initial temperature and the temperature of the first substrate heated by the inkjet head is about 3° C. In this case, the liquid crystal dropping stain was severe.

When the distance between the first substrate and the inkjet head was about 2.5 mm, the temperature of the first substrate went up to about 29° C. by the heat of the inkjet head having the temperature of about 50° C. The temperature difference between an initial temperature and the temperature of the first substrate heated by the inkjet head was about 2° C. In this case, the liquid crystal dropping stain was light.

When the distance between the first substrate and the inkjet head was about 3.5 mm and about 4.5 mm, the temperature of the first substrate went up to about 28° C. by the heat of the inkjet head having the temperature of about 50° C. The temperature difference between an initial temperature and the temperature of the first substrate heated by the heat of the inkjet head was about 1° C. In those cases, the liquid crystal dropping stain was not shown.

Consequently, when the temperature change of the first substrate by the heat of the inkjet head is about 1° C., the liquid crystal dropping stain maybe prevented.

According to the exemplary embodiment, when the temperature difference between the surface temperature of the first substrate and the surface temperature of the inkjet head is controlled within a range, the liquid crystal dropping stain may be removed.

Figure 4:
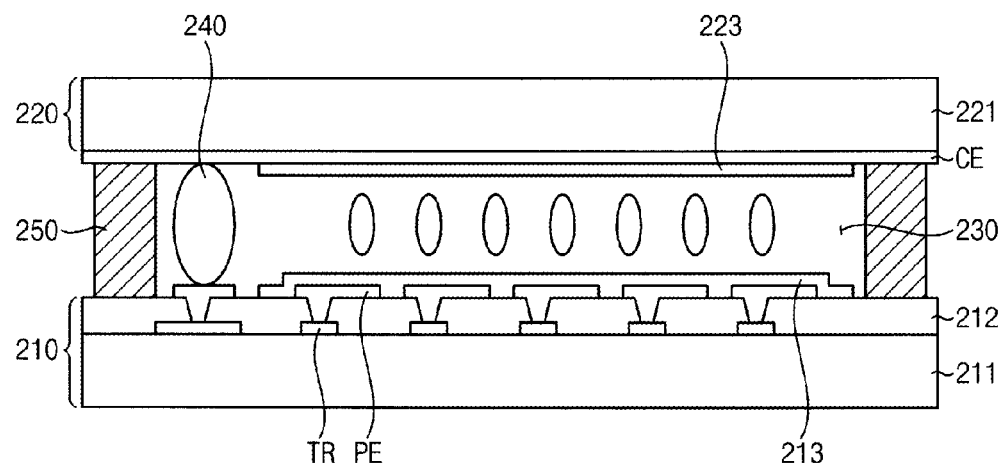
FIG. 4 is a cross-sectional view illustrating an exemplary embodiment of a liquid crystal panel according to the invention.
Figure 5A:
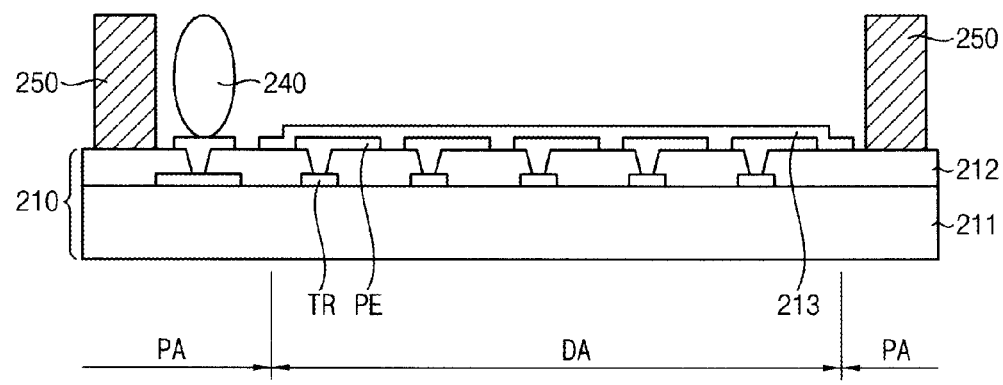
FIGS. 5A and 5B are cross-sectional view illustrating an exemplary embodiment of a method of manufacturing a liquid crystal panel according to the invention.
Figure 5B:
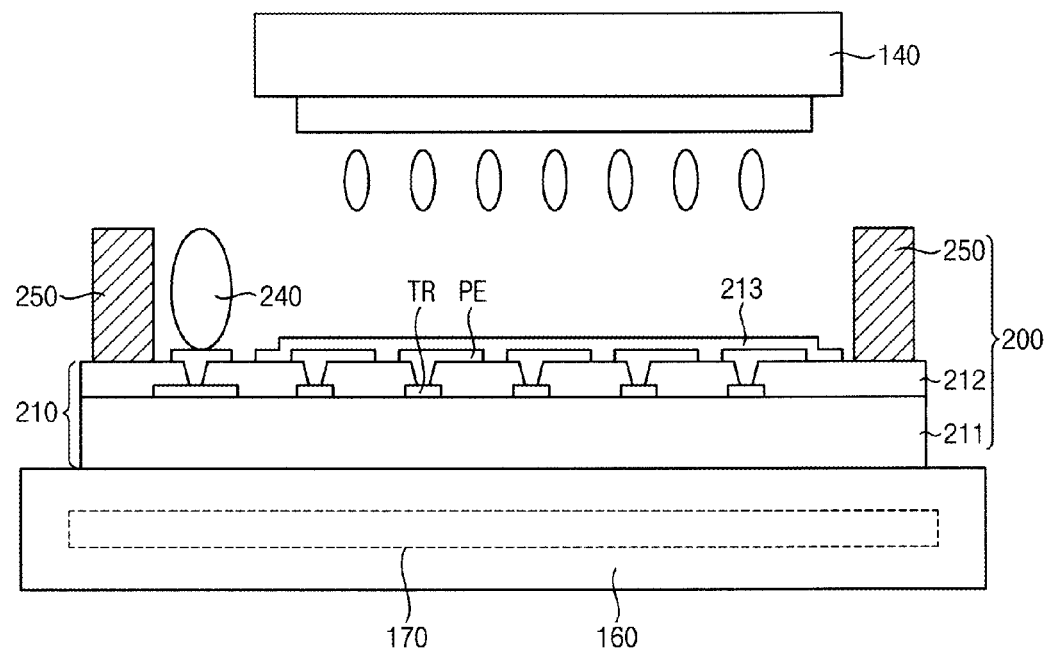

FIG. 4 is a cross-sectional view illustrating an exemplary embodiment of a liquid crystal panel according to the invention. FIGS. 5A and 5B are cross-sectional view illustrating an exemplary embodiment of a method of manufacturing the liquid crystal panel according to the invention.

Referring to FIG. 4, the liquid crystal panel includes a first display substrate 210, a second display substrate 220, a liquid crystal layer 230 (Please add a number 230 in FIG. 4), a shorting member 240 and a seal member 250. The first display substrate 210 includes a first base substrate 211, a plurality of thin film transistors TR, an insulating layer 212, a plurality of pixel electrodes PE and a first alignment layer 213.

The thin film transistors TR are electrically connected to a plurality of signal lines (not shown). The signal lines may include a gate line (not shown) extended in a first direction on the first base substrate 211 and a data line (not shown) extended in a second direction crossing the first direction on the first base substrate 211. The thin film transistors TR may be arranged as a matrix type in a display area of the first base substrate 211. The pixel electrodes PE are electrically connected to thin film transistors TR through a plurality of contact holes formed in the insulating layer 212. The first alignment layer 213 is disposed between the pixel electrodes PE and the liquid crystal layer 230. The first alignment layer 213 is disposed adjacent to the liquid crystal layer 230 and may control a pre-tilt angle of the liquid crystal molecules.

The second display substrate 220 is combined with the first display substrate through the seal member 250. The second display substrate 220 includes a second based substrate 221, a common electrode CE and a second alignment layer 223. The second display substrate 220 may include a plurality of color filters corresponding to a plurality of pixel areas. The color filters may be included in the first display substrate 210. The common electrode CE is opposite to the pixel electrodes PE. The second alignment layer 223 is disposed between the common electrode CE and the liquid crystal layer 230. The second alignment layer 223 is disposed adjacent to the liquid crystal layer 230 and may control a pre-tilt angle of the liquid crystal molecules.

The shorting member 240 is electrically connected the first display substrate 210 and the second display substrate 220. For example, the shorting member 240 is electrically connects a common voltage line included in the first display substrate 210 and the common electrode included in the second display substrate 230, so that a common voltage from the common voltage line is applied to the common electrode CE.

The liquid crystal layer 230 is formed by the inkjet printing method using the liquid crystal jetting apparatus according to the exemplary embodiment.

Referring to FIGS. 1 and 5A, the thin film transistors TR, the insulating layer 212, the pixel electrodes PE and the first alignment layer 213 are formed in the display area DA of the first base substrate 211 so that the first display substrate 210 is formed. The shorting member 240 and the seal member 250 are formed in the peripheral area PA surrounding the display area DA so that the first substrate 200 is formed.

Referring to FIGS. 1 and 5B, the first substrate 200 (Please add a number 200 in FIG. 5B) which is the first display substrate 210 including the seal member 250 and the shorting member 240 is loaded on the stage 160 of the liquid crystal jetting apparatus.

The temperature control part 110 controls the liquid crystal heating part 130 so that the liquid crystal heating part 130 heats the liquid crystal container 120 in order that the liquid crystal molecules have the target viscosity.

The temperature control part 110 controls the temperature measuring part 150 so that the temperature measuring part 150 measures the surface temperature of the inkjet head 140, and the surface temperature of the first substrate 200. The first temperature measuring part 150 measures the temperature of the surface on which the nozzles are disposed. The surface on which the nozzles are disposed may be adjacent to the first alignment layer 213 of the first display substrate 210. The second temperature measuring part 155 measures the temperature of the surface of the first substrate 200 or the stage 160.

The temperature control part 110 controls the substrate heating part 170 based on the surface temperature of the inkjet head 140 measured from the first temperature measuring part 150. The temperature control part 110 controls the substrate heating part 170 so that the first substrate 200 is heated to the second setting temperature. Thus, the temperature difference between the surface temperature of the first substrate 200 or the stage 160 and the surface temperature of the ink jet head 140 is controlled to be less than or equal to about 1° C. The substrate heating part 170 heats the stage 160 including the first substrate 200 loaded on the stage 160. The temperature control part 110 may control the temperature of the first substrate 200 or the stage 160 without feedback from a surface temperature of the inkjet head 140. The temperature control part may control the surface temperature of the first substrate 200, and the surface temperature of the inkjet head 140 to be the second setting temperature, respectively.

The temperature of the substrate heating part 170 is controlled so that the surface temperature of the first substrate 200 or the stage 160 is substantially the same as the surface temperature of the inkjet head 140. The inkjet head 140 jets the liquid crystal molecules on the first alignment layer 213 of the first substrate 200 through the nozzles.

Using the liquid crystal jetting apparatus according to the exemplary embodiment, the liquid crystal layer 230 is formed on the first substrate 200. The first substrate 200 is combined with the second display substrate 220 through a combining process. The liquid crystal forming process and the combining process may be performed before cutting a mother substrate into several display cell units. After the combining process, the mother substrate may be cut into several display cell units through a cutting process.

Figure 6A:
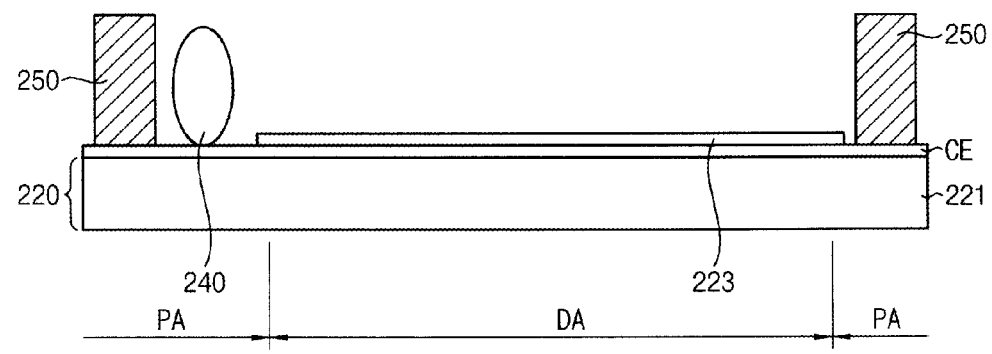
FIGS. 6A and 6B are cross-sectional view illustrating an exemplary embodiment of a method of manufacturing a liquid crystal panel according to the invention.
Figure 6B:
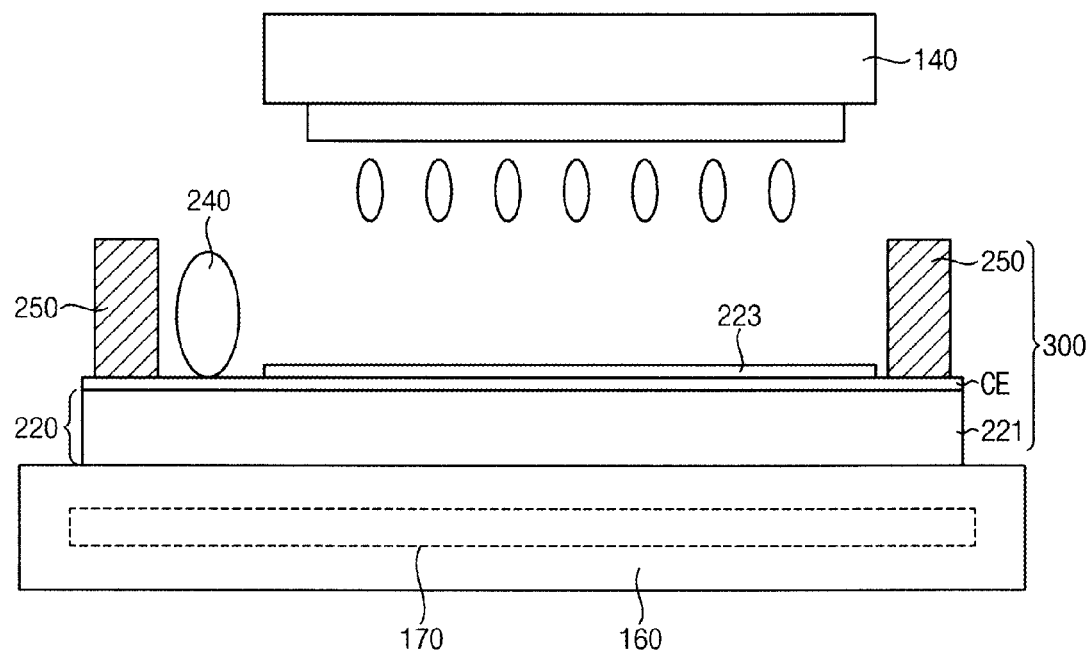

FIGS. 6A and 6B are cross-sectional view illustrating an exemplary embodiment of a method of manufacturing a liquid crystal panel according to the invention.

Referring to FIGS. 1 and 6A, the common electrode CE and the second alignment layer 223 are formed on the second base substrate 221. The second display substrate 220 may further include a plurality of color filters disposed between the second base substrate 221 and the common electrode CE. The shorting member 240 and the seal member 250 are formed in the peripheral area PA so that the second substrate 300 is formed.

Referring to FIGS. 1 and 6B, the second substrate 300 which is the second display substrate 220 including the shorting member 240 and the seal member 250 is loaded on the stage 160 of the liquid crystal jetting apparatus according to the exemplary embodiment.

The temperature control part 110 controls the liquid crystal heating part 130 so that the liquid crystal heating part 130 heats the liquid crystal container 120 in order that the liquid crystal molecules have the target viscosity.

The temperature control part 110 controls the temperature measuring part 150 so that the first temperature measuring part 150 measures a surface temperature of the inkjet head 140. The first temperature measuring part 150 measures the temperature of the surface of the inkjet head 140 on which the nozzles are disposed. The surface of the inkjet head 140 on which the nozzles are disposed may be adjacent to the second alignment layer 223 of the second display substrate 220.

The temperature control part 110 controls the substrate heating part 170 based on the surface temperature of the inkjet head 140 measured from the first temperature measuring part 150. The temperature control part 110 controls the substrate heating part 170 so that the substrate heating part 170 heats the second substrate 300 or the stage 160 to the second setting temperature. Thus, the temperature difference between the surface temperature of the second substrate 300 or the surface temperature of the stage 160 and the surface temperature of the ink jet head 140 is controlled to be less than or equal to about 1° C. The temperature control part 110 may control the temperature of the first substrate 200 or the stage 160 without feedback from a surface temperature of the inkjet head 140. The temperature control part may control the surface temperature of the first substrate 200, and the surface temperature of the inkjet head 140 to be the second setting temperature, respectively.

The temperature of the substrate heating part 170 is controlled so that the surface temperature of the second substrate 300 or the surface temperature of the stage 160 is substantially the same as the surface temperature of the inkjet head 140. The inkjet head 140 jets the liquid crystal molecules on the second alignment layer 223 of the second substrate 300 through the nozzles.

Using the liquid crystal jetting apparatus according to the exemplary embodiment, the liquid crystal layer 230 is formed on the second substrate 300 and the first display substrate 210 is combined with the second substrate 300 through a combining process. After the combining process, a mother substrate may be cut into several display cell units through a cutting process According to the exemplary embodiments of the invention, the surface temperature of the second substrate 300 or the surface temperature of the stage 160 is controlled to be substantially the same as the surface temperature of the inkjet head 140 so that the liquid crystal dropping stain may be prevented. Preferably, the temperature of the surface of the second substrate 300 or the stage 160 is controlled to be substantially the same as the surface temperature of the inkjet head so that the liquid crystal dropping stain may be removed.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A method of jetting a liquid crystal, comprising:
   loading a substrate onto a stage;
   measuring a surface temperature of an inkjet head, and controlling the surface temperature of the inkjet head and a surface temperature of the substrate to be a setting temperature based on the measured surface temperature of the inkjet head; and
   jetting liquid crystal molecules onto the substrate having the setting temperature.

2. The method of claim 1, wherein controlling the surface temperature of the substrate comprises controlling a temperature of the stage by controlling a temperature of a plurality of heat lines disposed in the stage.

3. The method of claim 1, wherein measuring the surface temperature of the inkjet head comprises measuring a temperature of a surface of the inkjet head on which nozzles for jetting the liquid crystal are disposed.

4. The method of claim 1, wherein a difference between the surface temperature of the inkjet head and the surface temperature of the substrate is less than or equal to about 1° C.

5. A method of manufacturing a liquid crystal panel, comprising:
   forming a first substrate including a first alignment layer;
   loading the first substrate onto a stage;
   measuring a surface temperature of an inkjet head, and controlling the surface temperature of the inkjet head and a surface temperature of the first substrate to be a setting temperature based on the measured surface temperature of the inkjet head;
   jetting liquid crystal molecules onto the first substrate having the setting temperature; and
   assembling the first substrate and a second substrate, wherein the first substrate includes a liquid crystal layer and the second substrate includes a second alignment layer.

6. The method of claim 5, further comprising:
   forming a seal member in a peripheral area of the first substrate; and
   forming a shorting member in the peripheral area of the first substrate,
   wherein the first substrate including the seal member and the shorting member is loaded onto the stage.

7. The method of claim 5, wherein controlling the surface temperature of the first substrate comprises controlling a temperature of the stage having the first substrate.

8. The method of claim 7, wherein controlling the temperature of the stage comprises controlling a temperature of a plurality of heat lines disposed in the stage.

9. The method of claim 5, wherein measuring the surface temperature of the inkjet head comprises measuring a temperature of a surface on which nozzles for jetting a liquid crystal are disposed.

10. The method of claim 5, wherein a difference between the surface temperature of the inkjet head and the surface temperature of the first substrate is less than or equal to about 1° C.

11. The method of claim 5, wherein the first substrate includes a plurality of thin film transistors and a plurality of pixel electrodes, and the second substrate includes a common electrode disposed opposite to the pixel electrodes.

12. The method of claim 5, wherein the first substrate includes a common electrode, and the second substrate includes a plurality of thin film transistors and a plurality of pixel electrodes disposed opposite to the common electrode.

13. The method of claim 3, wherein a difference between the surface temperature of the inkjet head and the surface temperature of the substrate is less than or equal to about 1° C.

14. The method of claim 1, wherein controlling the surface temperature of the substrate comprises:

measuring the surface temperature of the substrate, and controlling the surface temperature of the substrate and the surface temperature of the inkjet head to have substantially a same temperature.

15. The method of claim 14, wherein a difference between the surface temperature of the inkjet head and the surface temperature of the substrate is less than or equal to about 1° C.

* * * * *